(12) United States Patent
Patton et al.

(10) Patent No.: US 10,897,144 B1
(45) Date of Patent: *Jan. 19, 2021

(54) RECHARGING PLATFORM FOR ELECTRONIC DEVICES

(71) Applicant: AMPL Labs, Inc., San Clemente, CA (US)

(72) Inventors: Michael Patton, San Clemente, CA (US); Keith Resch, San Diego, CA (US); Rafael Calderon, San Diego, CA (US); Tomoko Nishioka-Patton, San Clemente, CA (US)

(73) Assignee: AMPL LABS, INC., San Clemente, CA (US)

( * ) Notice: Subject to any disclaimer, the term of this patent is extended or adjusted under 35 U.S.C. 154(b) by 29 days.

This patent is subject to a terminal disclaimer.

(21) Appl. No.: 15/916,147

(22) Filed: Mar. 8, 2018

Related U.S. Application Data

(63) Continuation of application No. 14/852,403, filed on Sep. 11, 2015, now Pat. No. 9,948,118.

(60) Provisional application No. 62/049,282, filed on Sep. 11, 2014.

(51) Int. Cl.
*H02J 7/00* (2006.01)
*H01M 10/42* (2006.01)

(52) U.S. Cl.
CPC .......... *H02J 7/0021* (2013.01); *H02J 7/0042* (2013.01); *H02J 7/0068* (2013.01); *H01M 10/4257* (2013.01)

(58) Field of Classification Search
CPC ........ H02J 7/0068; H02J 7/0013; H02J 7/045; H02J 7/047; H02J 7/0093; H02J 7/0042; H01M 10/4257

USPC .......................................... 320/107, 116–127
See application file for complete search history.

(56) References Cited

U.S. PATENT DOCUMENTS

| | | | |
|---|---|---|---|
| 7,366,925 B2 | 4/2008 | Keely et al. | |
| 8,397,310 B2 * | 3/2013 | Parris | A45C 5/14 340/539.22 |
| 8,432,124 B2 | 4/2013 | Foster | |
| 8,760,108 B2 | 6/2014 | Scarmozzino | |
| 8,864,583 B1 | 11/2014 | Edwards | |
| 9,041,354 B2 | 5/2015 | Lee | |
| 9,102,241 B2 | 8/2015 | Brabec | |
| 9,413,175 B2 | 8/2016 | Park et al. | |
| 9,948,118 B1 | 4/2018 | Patton et al. | |

(Continued)

FOREIGN PATENT DOCUMENTS

| | | |
|---|---|---|
| CN | 104578217 A | 4/2015 |
| WO | WO-2014/127428 A1 | 8/2014 |
| WO | WO-2015/054508 A1 | 4/2015 |

*Primary Examiner* — Nghia M Doan
(74) *Attorney, Agent, or Firm* — Cooley LLP

(57) ABSTRACT

An apparatus has connectors to receive batteries. A power multiplexer is connected to the connectors. A processor is connected to the power multiplexer to execute a battery charge protocol including the operations of selecting at least one battery for charging, where the at least one battery is in a fast charge state that allows for substantially linear charge performance. Direct current is applied to the battery until the fast charge state is terminated. The selecting and applying operations are repeated until the fast charge state is terminated in each of the batteries. Direct current is then directed to the batteries until a full charge state is reached for each of the batteries.

15 Claims, 17 Drawing Sheets

(56) References Cited

U.S. PATENT DOCUMENTS

| | | |
|---|---|---|
| 2009/0224722 A1 | 9/2009 | Causey |
| 2010/0231161 A1 | 9/2010 | Brown |
| 2012/0262116 A1 | 10/2012 | Ferber et al. |
| 2012/0319487 A1* | 12/2012 | Shah .................... H02J 7/0068 307/66 |
| 2013/0113436 A1* | 5/2013 | Ishibashi ............... H02J 7/0013 320/136 |
| 2013/0207616 A1 | 8/2013 | Shim |
| 2015/0228940 A1 | 8/2015 | Fujisawa |
| 2015/0288209 A1* | 10/2015 | Rippel .................. H02J 7/0063 320/107 |

* cited by examiner

RECHARGING PLATFORM FOR ELECTRONIC DEVICES

CROSS-REFERENCE TO RELATED APPLICATION

This application is a continuation of U.S. patent application Ser. No. 14/852,403, filed Sep. 11, 2015, which claims priority to U.S. Provisional Patent Application Ser. No. 62/049,282, filed Sep. 11, 2014, the contents of which are incorporated herein by reference.

FIELD OF THE INVENTION

This application relates generally to portable device charging. More particularly, this invention relates to a portable device charging station capable of intelligently monitoring, communicating with and routing power to and from a plurality of internal or modular batteries, electronic devices, and other charging ports.

BACKGROUND OF THE INVENTION

The proliferation of battery-powered electronic devices has increased demand for portable device recharging solutions. Many people carry five or more battery-powered electronic gadgets on a daily basis including, for example, smartphones, laptop computers, tablets, smart watches, wearable fitness trackers, among others. Known portable power technology has a fixed capacity that makes it difficult to charge devices with variable power. In addition, known portable power technology requires carrying multiple batteries that must be charged and discharged separately, making it inconvenient for users.

Accordingly, there is a need for a modular portable charging station to simplify portable device charging. Furthermore, there is a need for integration of such a charging station into carry bags and luggage to improve usability, transportability and convenience.

SUMMARY OF THE INVENTION

An apparatus has connectors to receive batteries. A power multiplexer is connected to the connectors. A processor is connected to the power multiplexer to execute a battery charge protocol including the operations of selecting at least one battery for charging, where the at least one battery is in a fast charge state that allows for substantially linear charge performance. Direct current is applied to the battery or batteries until the fast charge state is terminated. The selecting and applying operations are repeated until the fast charge state is terminated in each of the batteries. Direct current is then directed to the batteries until a full charge state is reached for each of the batteries.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
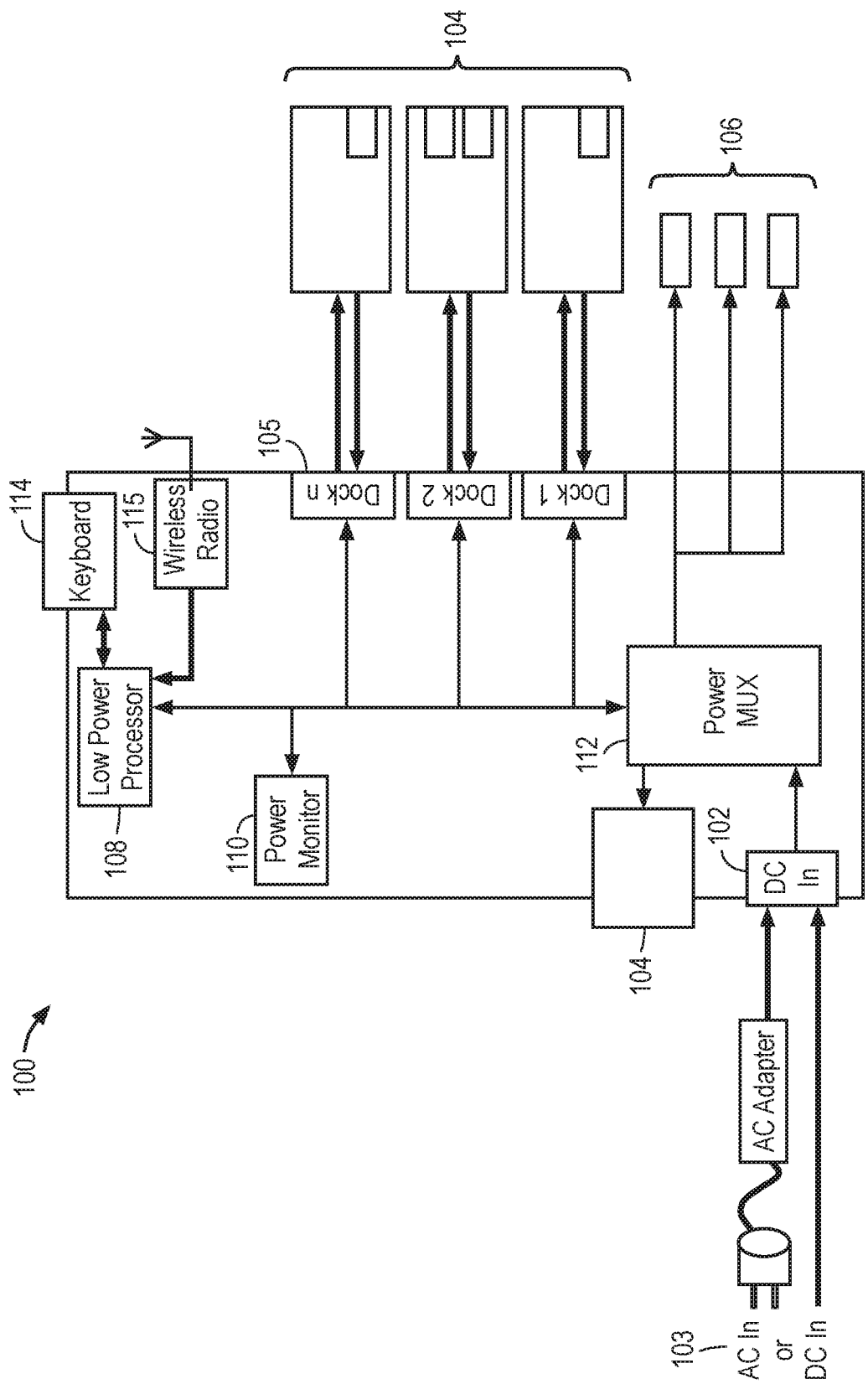
FIG. 1 illustrates a smart portable charging station configured in accordance with an embodiment of the invention.

Some embodiments described herein provide a smart portable charging station capable of routing power to and from a plurality of system batteries and portable electronic devices when connected to a power source, or from stored battery capacity when disconnected from input power. The smart portable charging station provides flexibility in total system battery capacity through docking bays that accept modular system expansion batteries.

Some embodiments described herein provide a means for the user to monitor charging and environmental conditions and control the system to prioritize charging order, adjust battery capacity reserve thresholds and exchange data between system components via a user interface connected to the system or wirelessly through a companion mobile or computer application.

Some embodiments described herein provide a convenient means of transporting the portable charging station by integrating the system into carry bags (including backpacks, briefcases, messenger bags, tote bags, handbags, etc.), luggage and other specialty bag types (including camera bags, music cases, sports bags, etc.), and providing convenient access to an AC and/or DC charging cable, multiple expansion battery docking bays, and access to USB ports from within pockets of the bag.

In some embodiments, the smart portable charging station includes one or more system batteries (internal to the system or modularly attached via docking bays), one or more input ports for connecting the system to AC or DC power sources, one or more output ports for connecting portable electronic devices to the system, a microprocessor controller, a system/power management bus, and a user interface.

The smart portable charging system can be configured to charge a plurality of system batteries and connected portable electronic devices by assigning a charging priority order and providing optimal charging current to as many devices as is possible simultaneously, given the capacity of the current configuration of the system.

Installing or removing expansion battery packs from one or more module docking bays may adjust the total battery storage capacity of the system. When connected to an AC or DC power source, once currently charging batteries reach a threshold charge level the system may reroute charging current to other connected system batteries based on the assigned charging priority order. When all system batteries reach defined threshold charge levels, the system trickle charges all system batteries simultaneously until each reaches full capacity or the system is removed from the power source.

In some embodiments, system batteries may include additional features beyond power storage, including for example; wireless communications, location tracking, data storage, portable audio amplification, portable image projection or display, portable document scanning, or others.

Additionally, portable electronic devices connected to one or more charging ports may be provided with power from the system and charged in the order assigned in the charge priority settings. The system may attempt to charge as many devices simultaneously as possible constrained by the available system power capacity and the order defined by the current charge priority order settings. Users can adjust the priority order to ensure power is always routed to devices in the most appropriate order.

To enable user monitoring and control of the system, the smart portable charging station may include one or more thermal and environmental sensors, system memory, and a means of wireless communications.

By means of the user interface, the system can report current charging conditions, including identifying to which ports devices are connected, which connected devices are currently charging or discharging, and current battery capacity of any connected system batteries or the total combined system capacity. Charging priority and charge threshold levels can be adjusted to suit current needs.

Additionally, in embodiments that include one or more environmental sensors, the user can monitor thing like internal/external temperatures, barometric pressure and/or relative humidity, and receive alerts or adjust system functions when condition fall outside of normal operating conditions. Other sensors, including accelerometers or pedometers, may add functionality including step counting, movement alerts, drop impact force notifications, or others.

Some embodiments described herein include the integration of the smart charging station into carry bags and luggage. System components are contained within enclosures that are joined to the structure of the bag at one or more locations in internal or external walls, and provide access to expansion module docking bays, USB charging ports and a user interface.

Some embodiments described herein incorporate a thermal dissipation system to enable passive or active cooling of the internal compartments of the bag, and impact dampeners to protect the smart charging station components and users' portable electronic devices stored within from accidental drops.

FIG. 1 illustrates a smart portable charging station configured in accordance with an embodiment of the invention.

The smart portable charging station 100 includes a set of power input ports 102 for connecting the system to alternating current (AC) or direct current (DC) power sources 103. A set of system batteries 104 (internal to the system or modularly attached via docking bays) are attached to connectors or docks 105. Output ports 106 are used for connecting battery-powered electronic devices to the system. A microprocessor 108 controls components of the system. In particular, the microprocessor 108 executes a battery charge protocol and battery discharge protocol, as discussed below. A power monitor 110 is connected to the processor 108. The microprocessor 108 controls a power multiplexer (MUX) 112, which is used to execute the battery charge protocol and battery discharge protocol. The microprocessor 108 is also connected to a tactile interface 114 (e.g., a keyboard, touch display and the like). The microprocessor 108 is also connected to a wireless radio 115 for communication with a mobile device executing a power management application, as discussed herein.

System batteries 104 recharge when an AC or DC power source 103 is connected to the system. The processor controlled multiplexer 112 routes direct current to system batteries 104 according to a charge protocol as discussed in FIG. 3. The processor controlled multiplexer 112 also routes power from an input power source or attached system batteries to a plurality of power output ports for charging portable electronic devices according to a charge protocol as discussed in FIG. 5. When disconnected from an input power source 103, system batteries 104 discharge to provide output power to charging ports 106 until a reserve capacity threshold is reached, as defined in FIG. 7.

Figure 2:
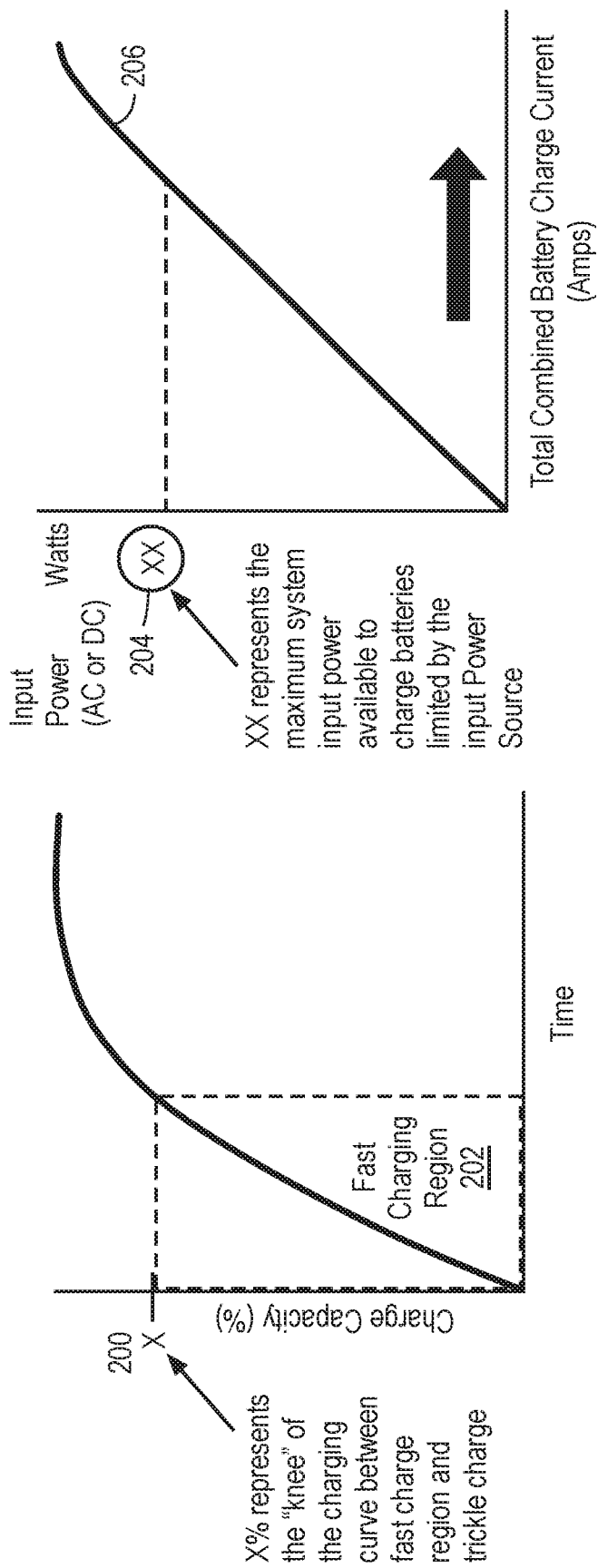
FIG. 2 illustrates a system battery charge rate of lithium-based battery cells in accordance with an embodiment of the invention.

FIG. 2 illustrates a system battery charge rate of lithium-based battery cells. A fast charging region 202 has substantially linear charge performance. After a certain threshold charge capacity x % 200, substantially linear charge performance is no longer available. Above this threshold charge capacity x %, the battery cells accept a lower current "trickle charge." The fast-charge/slow-charge regions can utilize a system battery charging protocol as discussed in FIG. 3. FIG. 2 also illustrates the total combined battery charge current capacity 206 given the maximum input power available to the system XX Watts 204, which is limited by the input power source.

Figure 3:
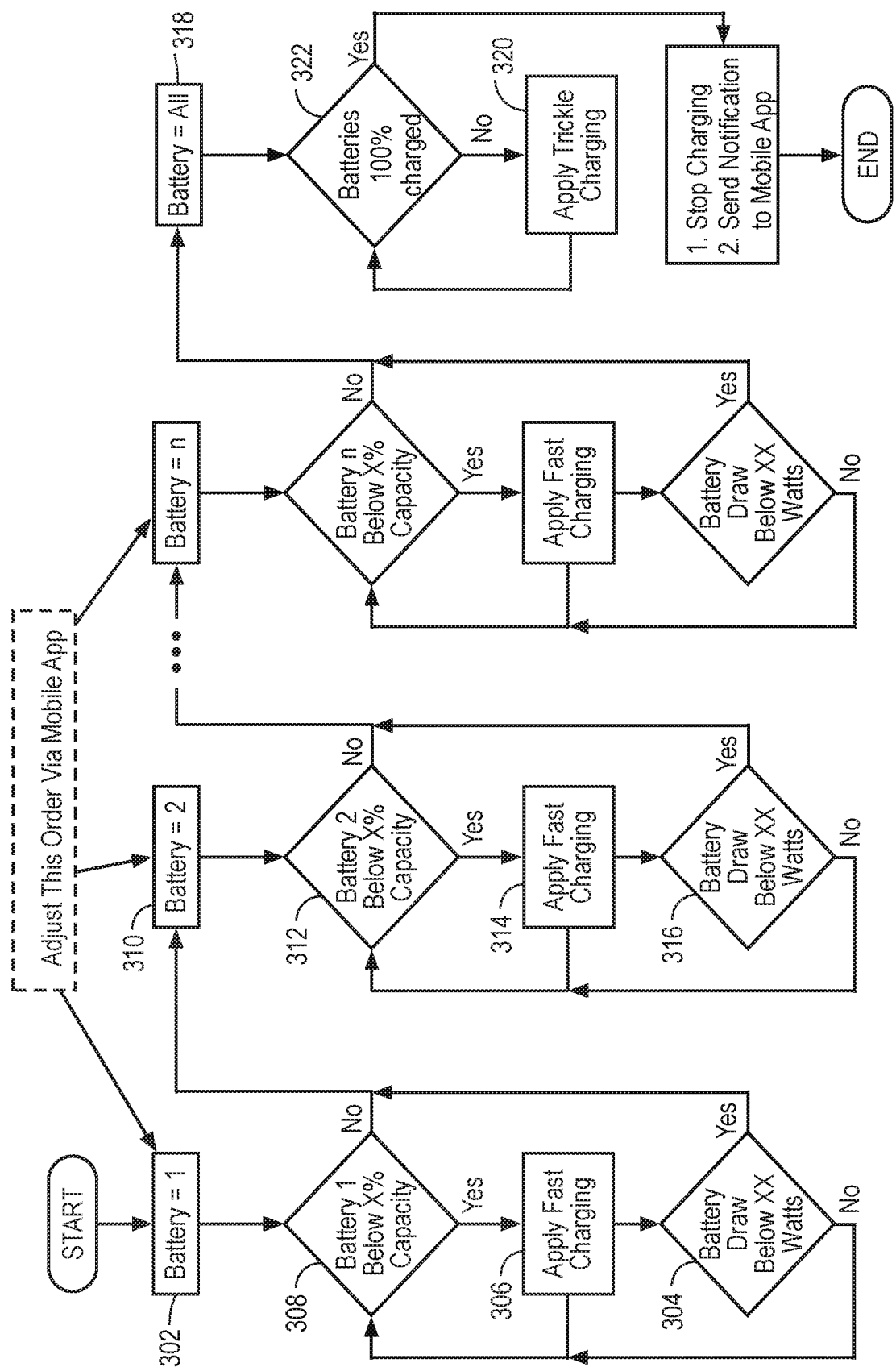
FIG. 3 illustrates a system battery charging protocol in accordance with an embodiment of the invention.

FIG. 3 illustrates a system battery charging protocol in accordance with an embodiment of the invention. When an input power source 103 is connected to the system, the processor controlled multiplexer 112 routes DC charging current to the first system battery 302. If the first battery is below a threshold capacity x % (308—Yes), direct charging current is applied 306. If the current draw of the first battery is lower than the maximum system input power available XX Watts 204, the processor controlled multiplexer routes power to the second connected system battery 310. When the first battery 302 is no longer below the threshold capacity x % (308—No), the multiplexer 112 reroutes available charging current to the second connected system battery 310. If the second battery is below its threshold capacity x % (312—Yes), direct charging current is applied 314. This process is repeated for all connected system batteries. When all system batteries are above a threshold capacity X %, the multiplexer routes direct current to all batteries 318 and applies a trickle charge 320 until each reaches full capacity 322.

The priority order of battery 1 through battery n can be adjusted as desired through the user interface at 316. By utilizing this protocol, the system of the present invention may attempt to provide the maximum charging current possible to charge all connected system batteries up to their threshold capacity x %. When all batteries exceed their threshold capacity x % at 318, the processor controlled multiplexer may route DC charging current to all connected system batteries simultaneously to trickle charge them all at 320 until each reaches 100% capacity 322. Utilizing this protocol, the time required to recharge a plurality of connected system batteries is minimized.

Figure 4:
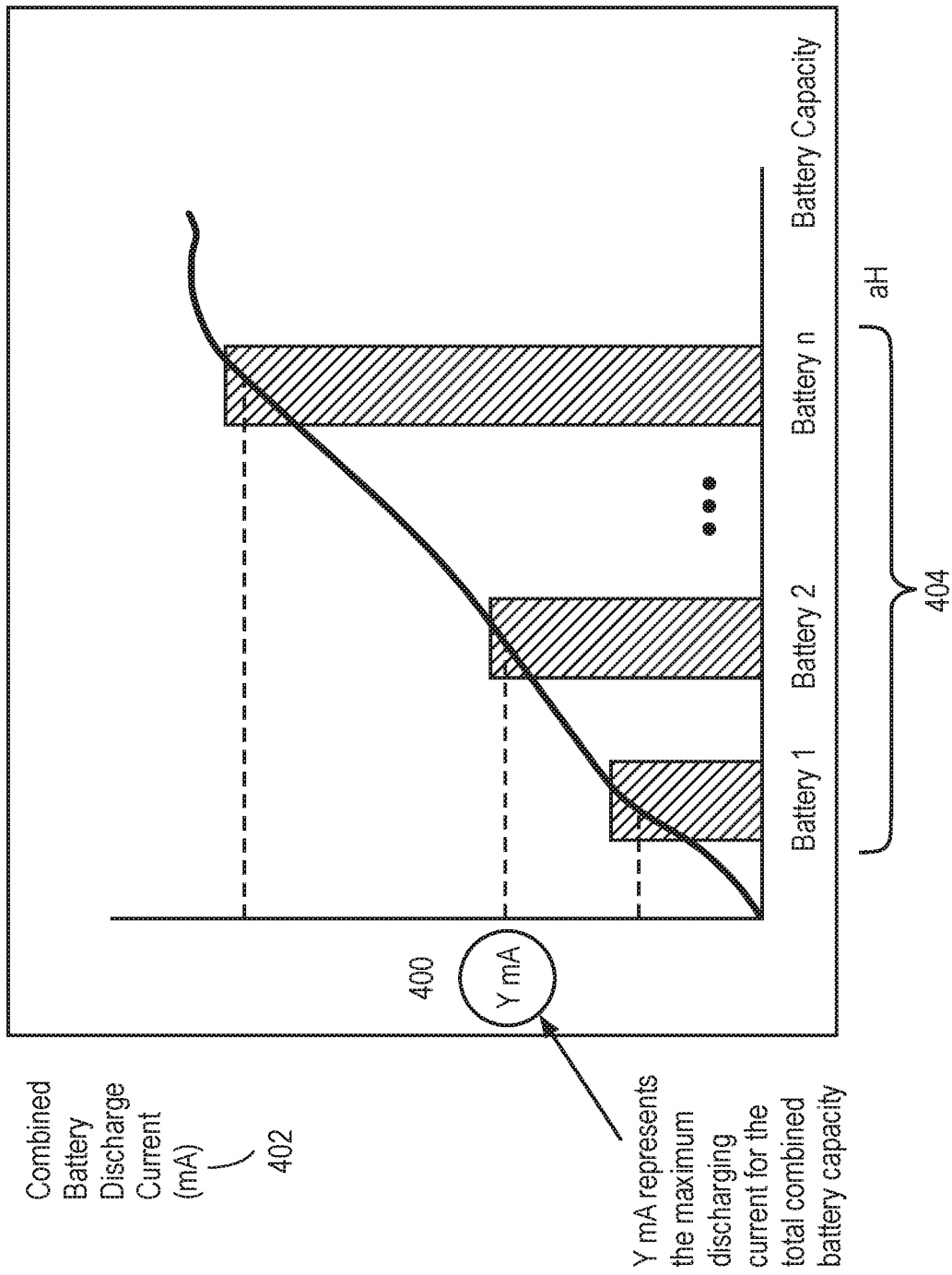
FIG. 4 illustrates a combined battery discharge current plot in accordance with an embodiment of the invention.

FIG. 4 illustrates a combined battery discharge current plot in accordance with an embodiment of the invention. The total combined discharge current available when a plurality of system batteries is connected is represented at 402. Each additional connected system battery 404 increases the total combined available discharge current. y mA 400 represents the maximum charging current available given the number of connected system batteries.

Figure 5:
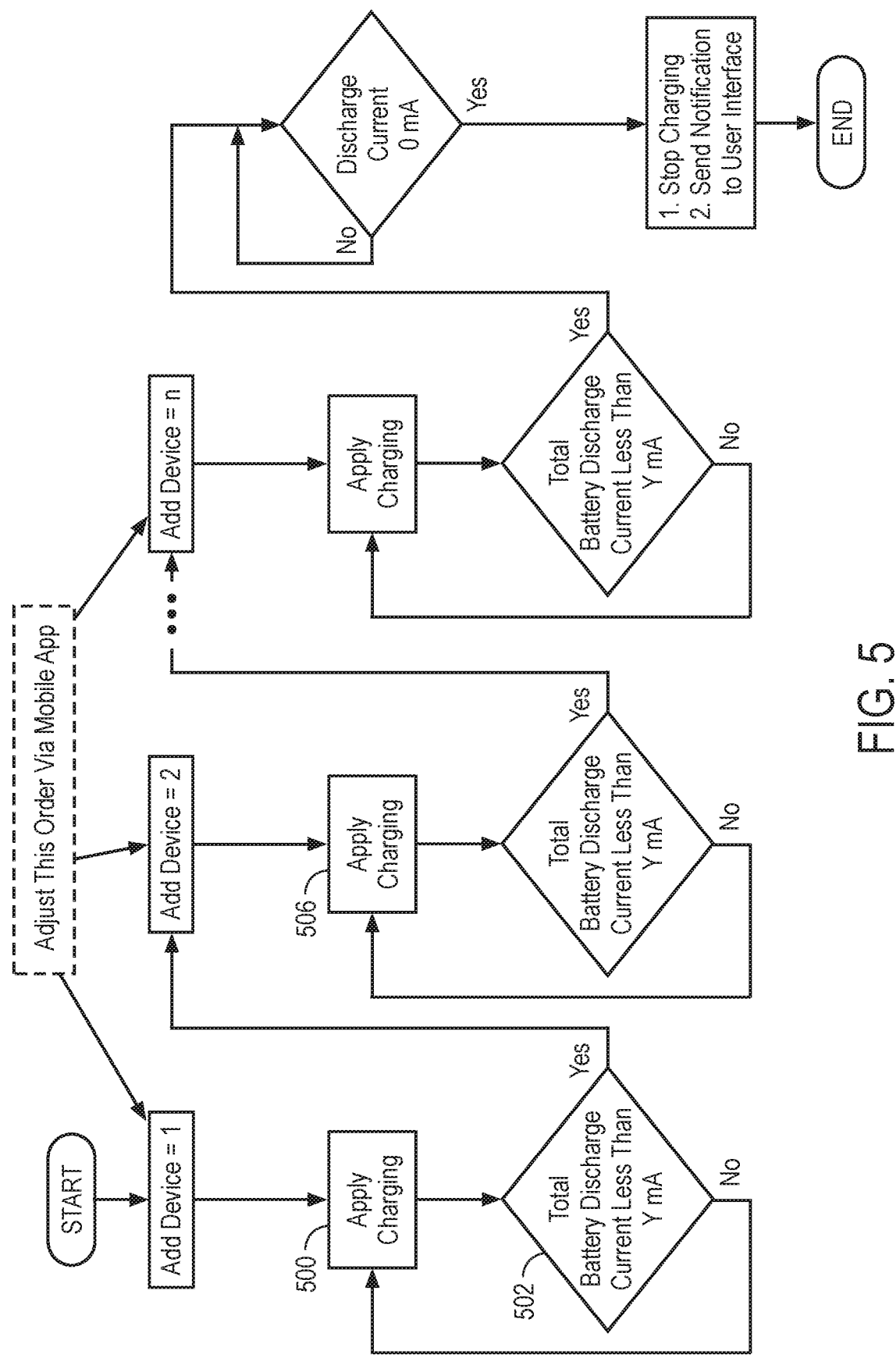
FIG. 5 illustrates an output device charging protocol in accordance with an embodiment of the invention.

FIG. 5 illustrates an output device charging protocol in accordance with an embodiment of the invention. When devices are connected to output ports, the processor controlled multiplexer routes direct charging current to the first device 500. Block 502 tests whether the discharge current to the first device is below the maximum discharge current available from the total combined battery capacity (y mA) 400. If so (502—Yes), the system routes additional direct charging current to the second device 506 and so on, until the output charging current reaches the total combined available discharge current capacity (y mA) 400. If the discharge current to the first device is not less than the maximum discharge current available (502—No), the system continues to apply charging to device 1 only until device 1 reaches its capacity and ceases to draw charging current. Utilizing this protocol, the number of devices that can be charged simultaneously is maximized given the total combined system battery capacity (y mA) 400.

Figure 6:
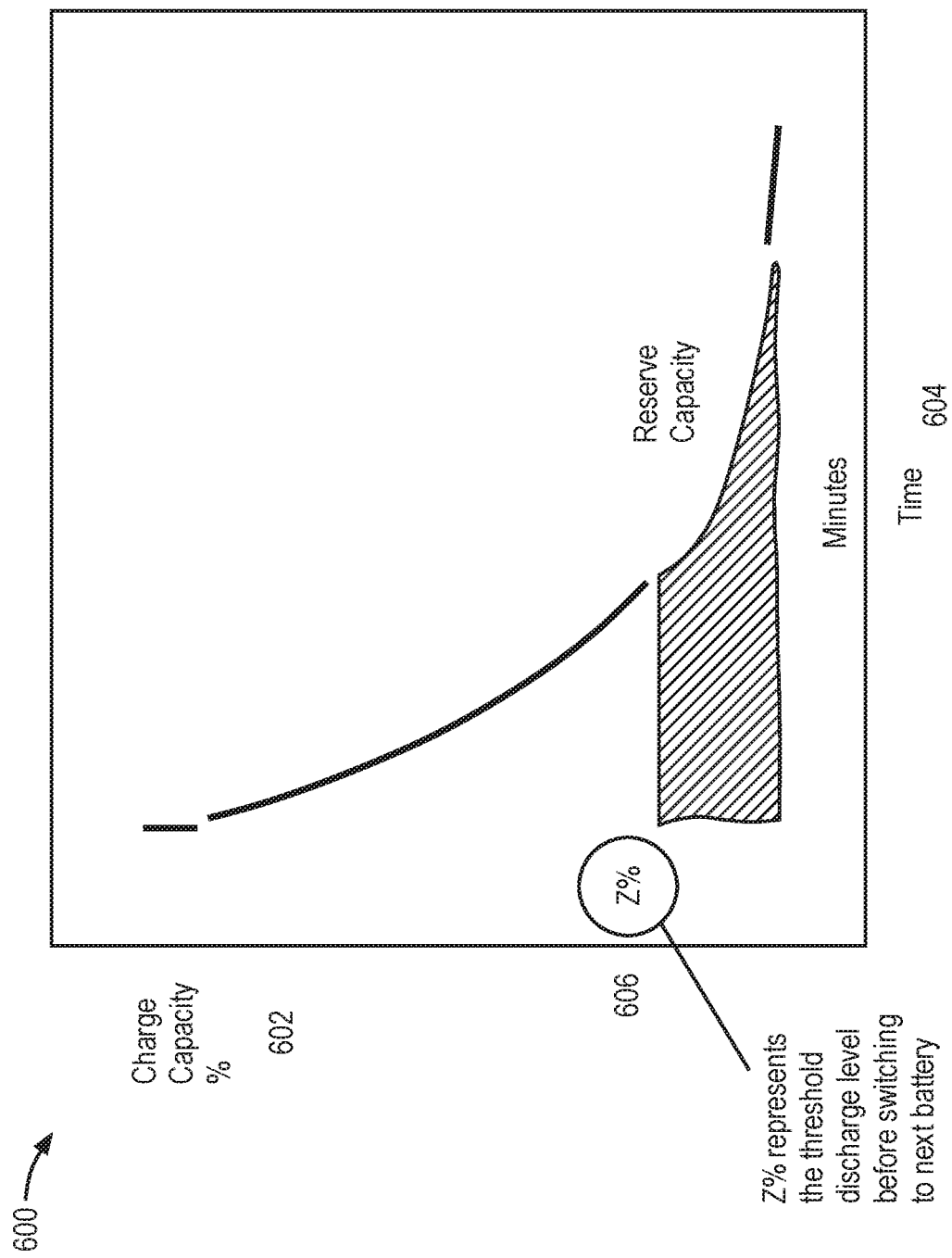
FIG. 6 illustrates system battery reserve settings in accordance with an embodiment of the invention.

FIG. 6 illustrates system battery reserve settings in accordance with an embodiment of the invention. The plot 600 shows the discharging of system batteries 602 over time 604. A reserve capacity threshold Z % 606 can be set for each system battery or the combined capacity of all connected system batteries. When the reserve capacity 606 is reached, the system may disable power output from the plurality of system batteries to maintain a capacity reserve for emergency usage. The reserve capacity may be configurable by a user or may be altogether eliminated by a user.

Figure 7:
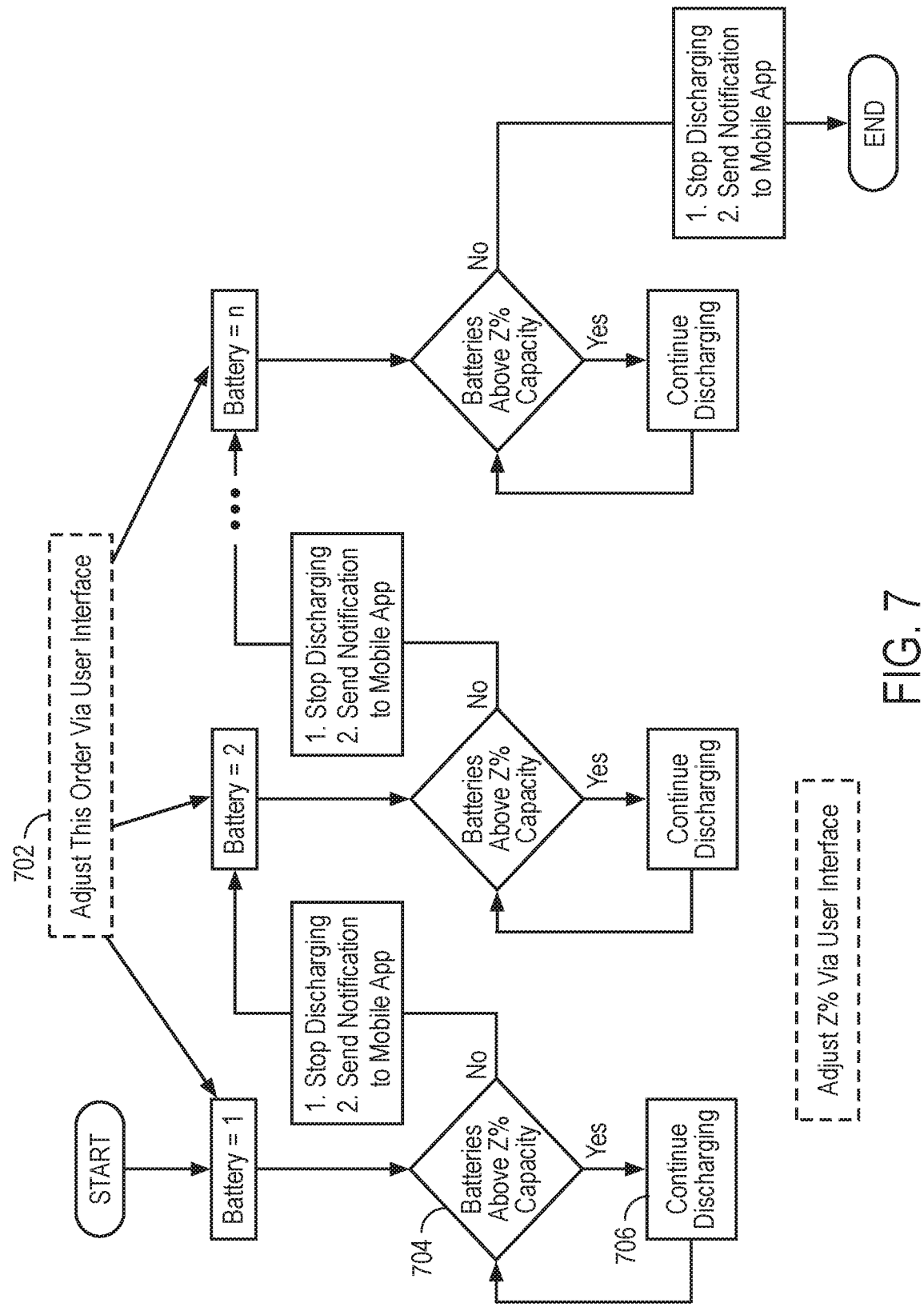
FIG. 7 illustrates a system battery reserve capacity protocol in accordance with an embodiment of the invention.

FIG. 7 illustrates a system battery reserve capacity protocol in accordance with an embodiment of the invention. A reserve capacity is set for each connected system battery and can be adjusted through the user interface 702. When discharging system batteries, the processor-controlled power multiplexer 112 may attempt to draw current from each connected system battery 104 and route direct charging current to output charging ports 106 until a predefined threshold reserve capacity Z % 606 is reached for each system battery. If the capacity is above the reserve capacity Z % (704—Yes), charging continues 706. When the reserve capacity threshold is reached (704—No), power output may be disabled 708 to retain the reserve capacity Z % 606. A notification may also be sent to a mobile application. Reserve system battery capacity can be used as necessary by overriding the reserve threshold settings via the user interface.

Figure 8:
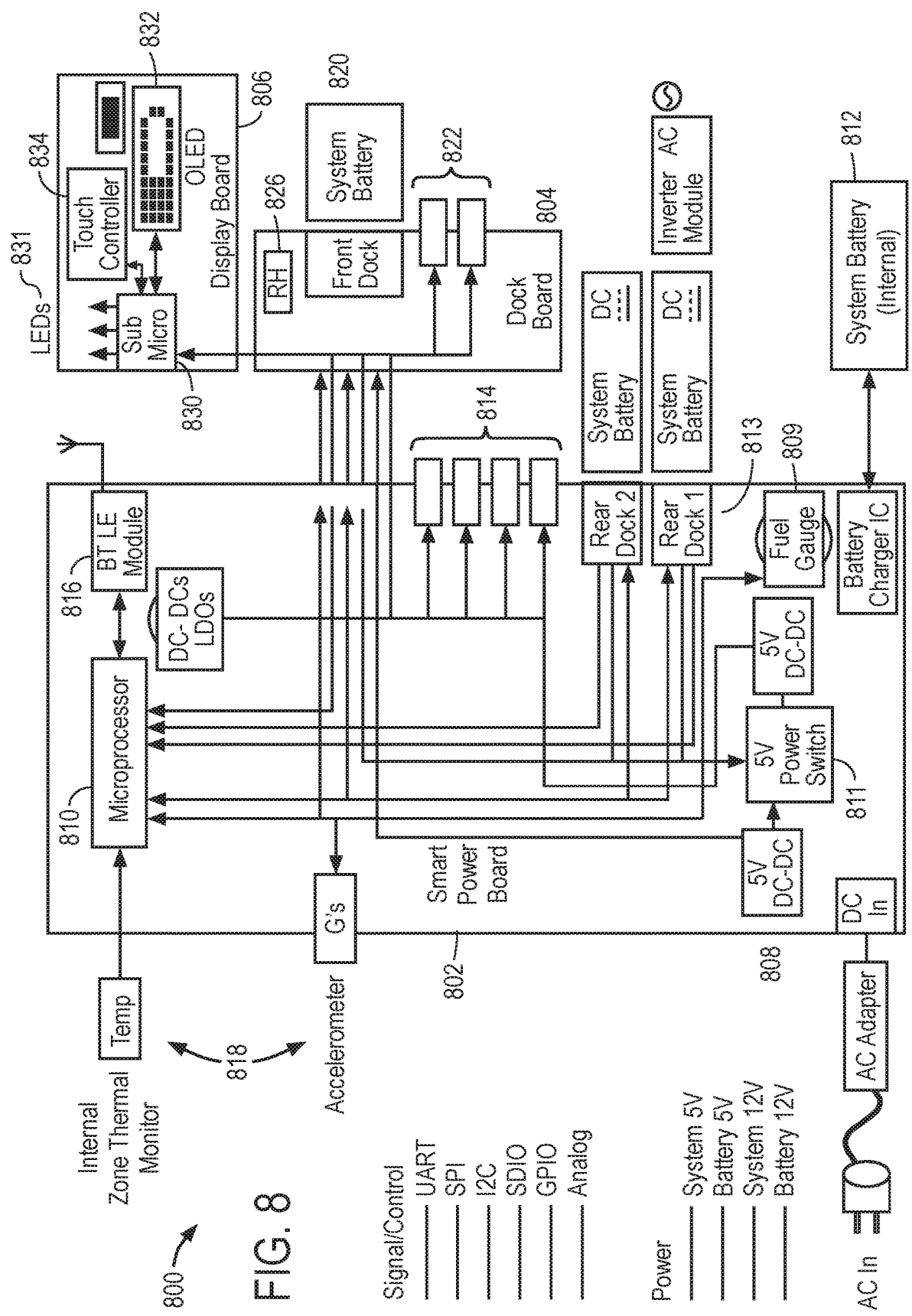
FIG. 8 illustrates a smart power system board in accordance with an embodiment of the invention.

FIG. 8 illustrates a smart power system board in accordance with an embodiment of the invention. The smart power system 800 includes a Smart-Power board 802, an auxiliary Docking board 804 and a Display board 806. The Smart-Power board 802 includes a DC power input port 808 to receive power from a DC power source, or from an AC power source by means of an AC-DC power adapter. A microprocessor 810 is connected to a Fuel Gauge power monitor 809 and various Power Switches 811 to route direct charging current to and from various system components. The microprocessor 810 monitors charging of system batteries and applies the system battery charging protocol discussed in connection with FIG. 3. The microprocessor 810 also controls the discharging of connected system batteries according to the reserve capacity protocol discussed in connection with FIG. 7.

An internal system battery 812 is included, and there are two system battery docking bays 813 for attaching modular expansion system batteries in addition to four USB output power ports 814 for connecting portable electronic devices to be charged.

Input 12V DC power is multiplexed to provide direct charging current to internal and connected system batteries according to the system battery charging protocol discussed in connection with FIG. 3. 12V DC charging current from the power input or discharging system batteries can be stepped down to 5V to provide charging current for portable electronic devices connected to the USB ports.

Power switches 811 allow the processor 810 to control the flow of 5V current to adjust the charging priority order of devices connected to USB ports 814 according to the protocol discussed in connection with FIG. 5.

A Bluetooth LE radio module 816 is connected to the microprocessor 810 to enable two-way communication between the system and an application running on a phone, tablet or computer.

Also included on the Smart-Power board 802 are various sensors 818, including temperature sensors to monitor thermal conditions internal and external to the system, and an accelerometer to measure movement of and impact to the system.

The Docking board 804 is connected to the Smart-Power board 802 via a wire harness capable of transmitting power and data. The Docking Board 804 consists of one additional system battery docking bay 820, and two additional USB output power ports 822. Also included on the Docking Board 804 is a temperature/humidity sensor 826 to gather information about the external environment of the system.

The Display Board 806 is connected to the Docking Board 804 and includes a microprocessor 830, display LEDs 831, an OLED display 832 and a touch-controller 834. Thus, the device can have its own tactile interface to receive input and display information. As discussed below similar information may be collected and reported via an associated application running on a mobile device.

Figure 9:
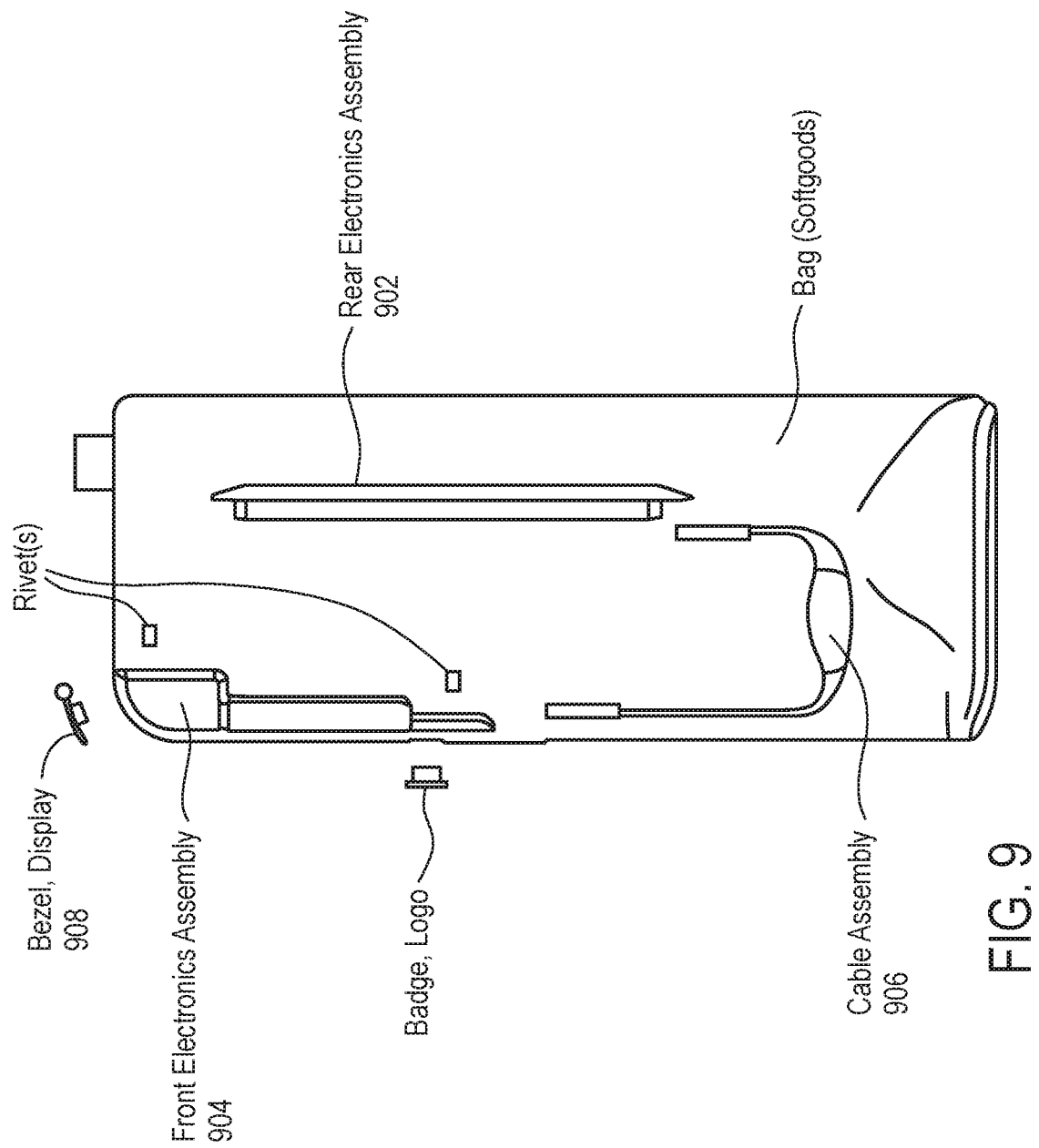
FIG. 9 illustrates integration of smart portable charging system into a carry bag in accordance with an embodiment of the invention.

FIG. 9 illustrates integration of smart portable charging system into a carry bag in accordance with an embodiment of the invention. The assembly consists of a rear electronics assembly 902 mounted to an interior wall of the backpack, a front electronics assembly 904 mounted to the exterior front wall of the backpack, and a cable assembly 906 routed internally to walls of the backpack to connect the two assemblies. The enclosure may also include an external display 908.

Figure 10:
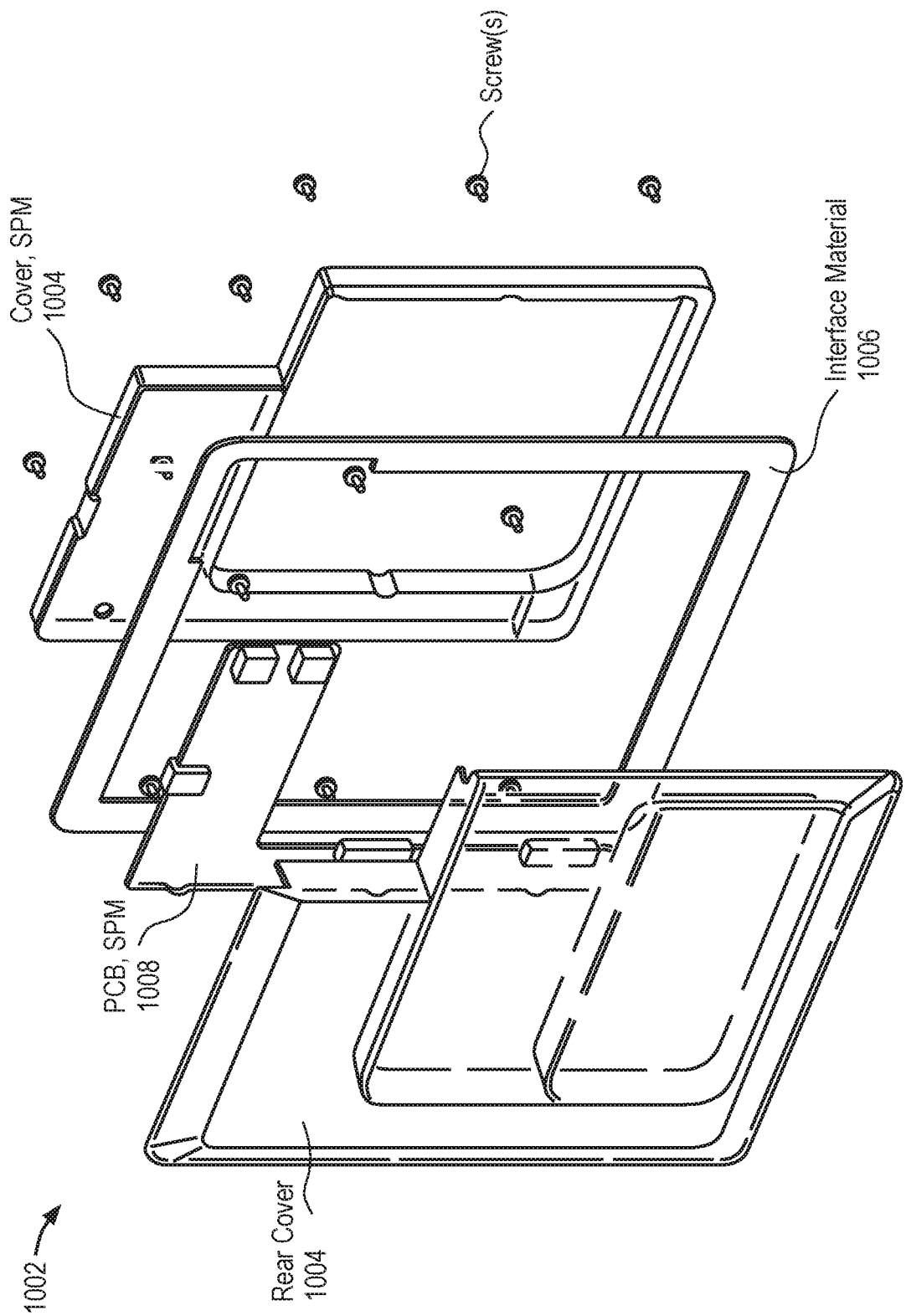
FIG. 10 illustrates a rear electronic assembly in accordance with an embodiment of the invention.

FIG. 10 illustrates a rear electronic assembly in accordance with an embodiment of the invention. The rear electronic assembly 1002 includes the Smart-Power board 1008 assembled into an enclosure consisting of two plastic covers 1004, and an interface material 1006 for attaching the rear electronics assembly 1002 to the interior wall of the backpack.

Figure 11:
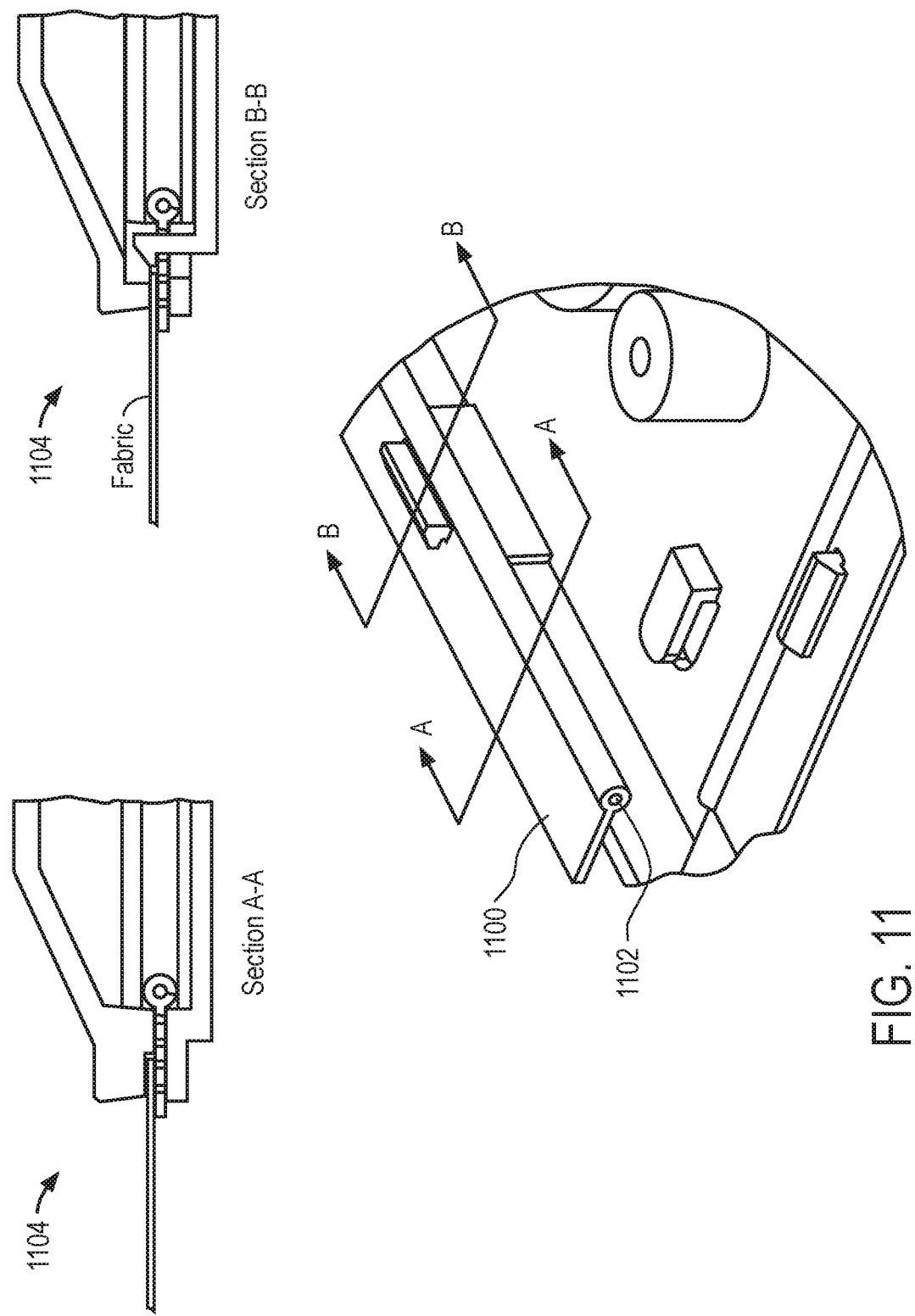
FIG. 11 illustrates a fabric interface for an enclosure integrating electronics in accordance with an embodiment of the invention.

FIG. 11 illustrates an interface material integrated with a rear electronics assembly in accordance with an embodiment of the invention. The interface material 1100 has an anchor structure 1102. Fabric 1104 is stitched or attached by other means to the interface material. The rear electronics assembly is clamped to the interface material, and the interface material is sewn or otherwise attached to the interior wall of the backpack.

Figure 12:
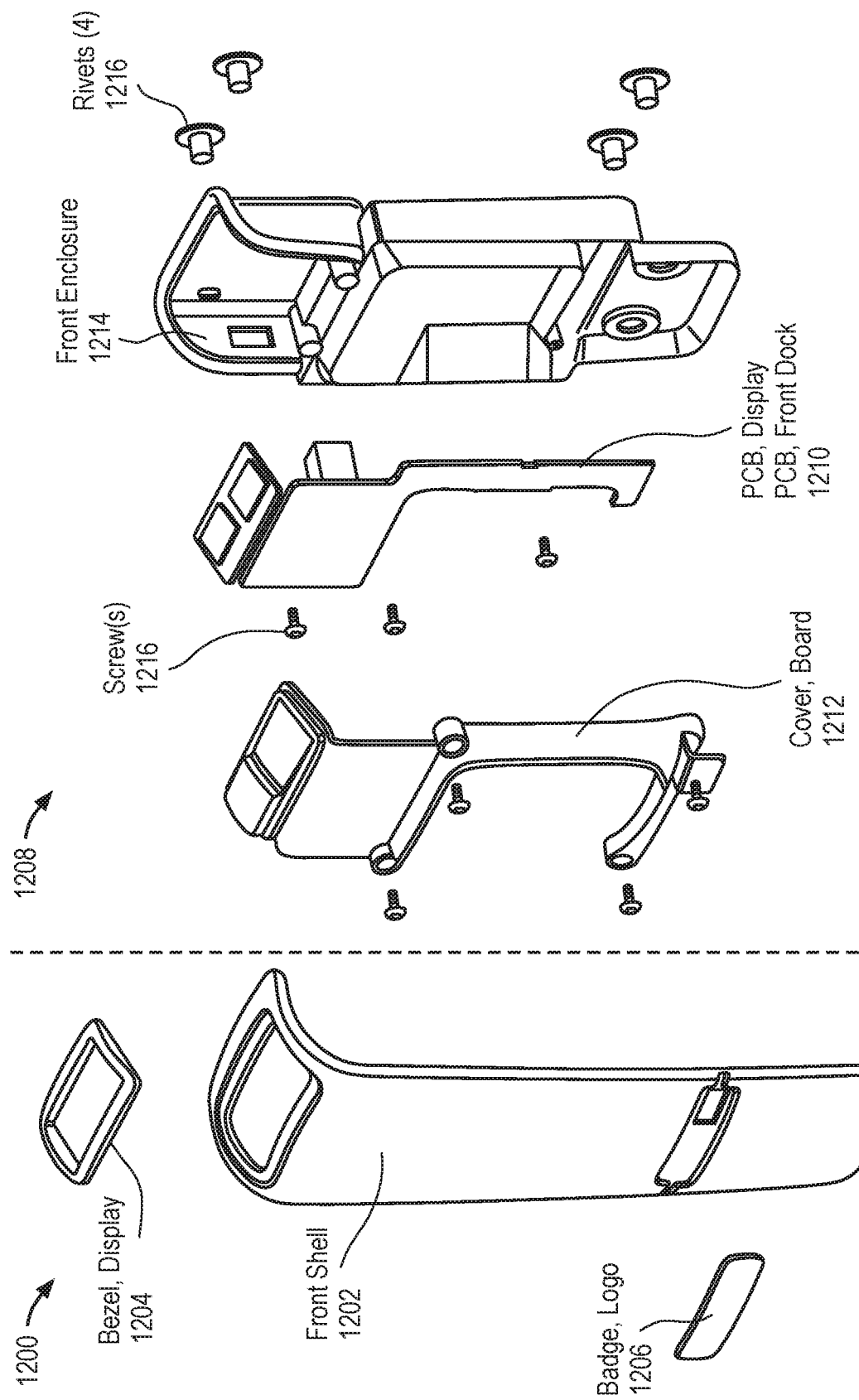
FIG. 12 illustrates an electronics assembly in accordance with an embodiment of the invention.

FIG. 12 illustrates a front electronics assembly in accordance with an embodiment of the invention. The front electronics assembly 1200 includes a front shell 1202, display 1204 and badge logo 1206, which are each external to the bag. The external components are attached to an internal enclosure housing 1208 including a printed circuit board 1210 (e.g., 804 and 806 of FIG. 8), a cover 1212 and a front enclosure 1214, which are attached using various fasteners 1216. The boards are mounted to the enclosure using screws and the whole assembly is mounted to the bag using rivets to join the display bezel and badge/logo with the enclosure.

Figure 13:
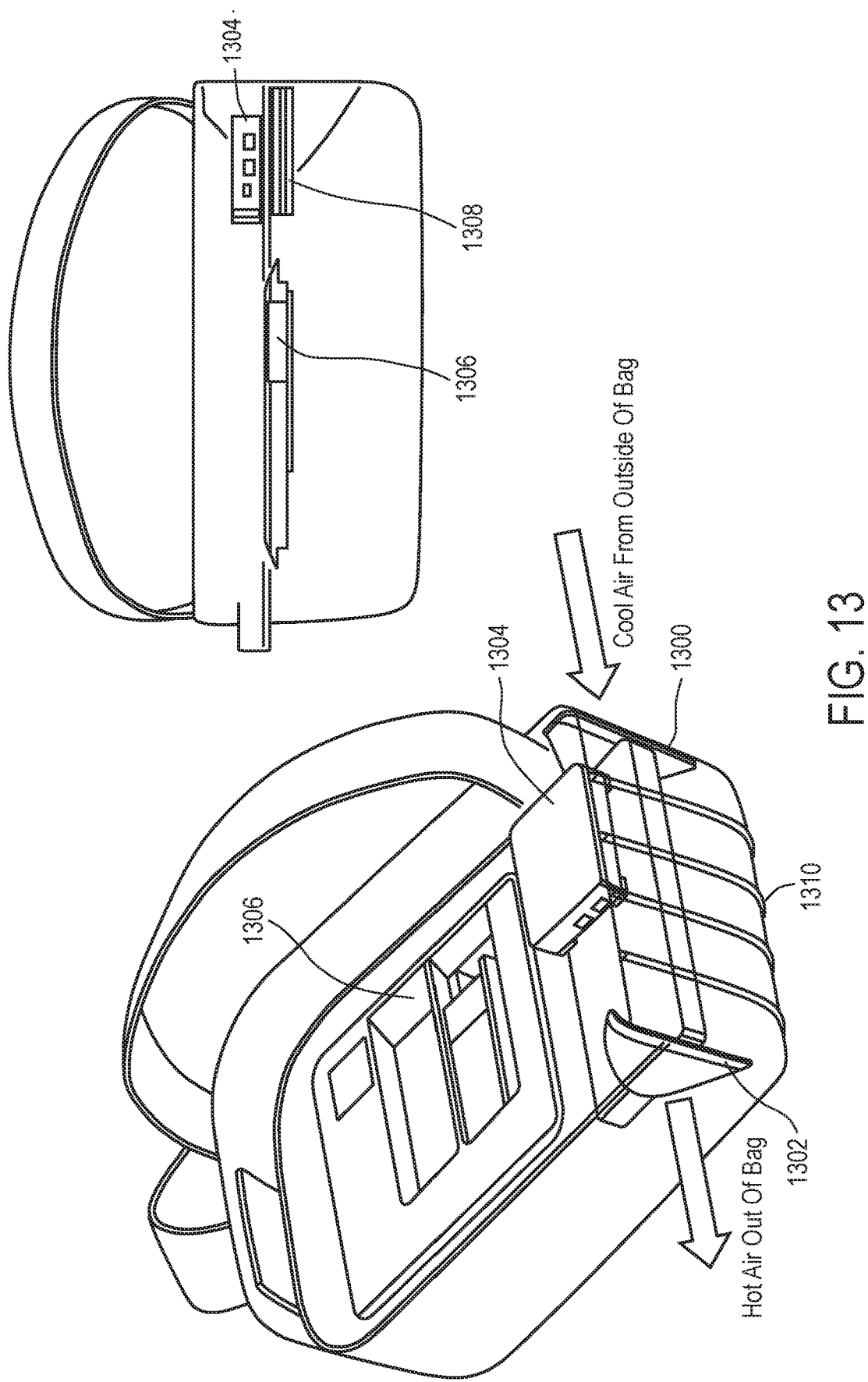
FIG. 13 illustrates a thermal dissipation and impact dampening system in accordance with an embodiment of the invention.

FIG. 13 illustrates a thermal dissipation and impact dampening system integrated into the backpack in accordance with an embodiment of the invention. The thermal dissipation and impact dampening system includes vents 1300 and 1302 to allow an exchange of warm air from inside the bag with cool air external to the bag. The thermal dissipation system may operate both passively and actively, utilizing a fan built into a DC-to-AC power inverter 1304 which can be attached to compatible system batteries 1306 to provide an AC power outlet. When the Inverter is active, cool air is drawn into the thermal chamber 1308 of the bag through vent 1300 and warm air is exhausted from the chamber via vent 1302. In one embodiment, the thermal chamber 1308 is constructed of pressed foam that in combination with rubber bumpers 1310 on the bottom of the bag provides impact dampening for the internal components of the bag when dropped. The impact dampening features provide internal vertical structural support to the rear electronics enclosure 902 and shock absorption for all contents of the bag from external impact.

Figure 14:
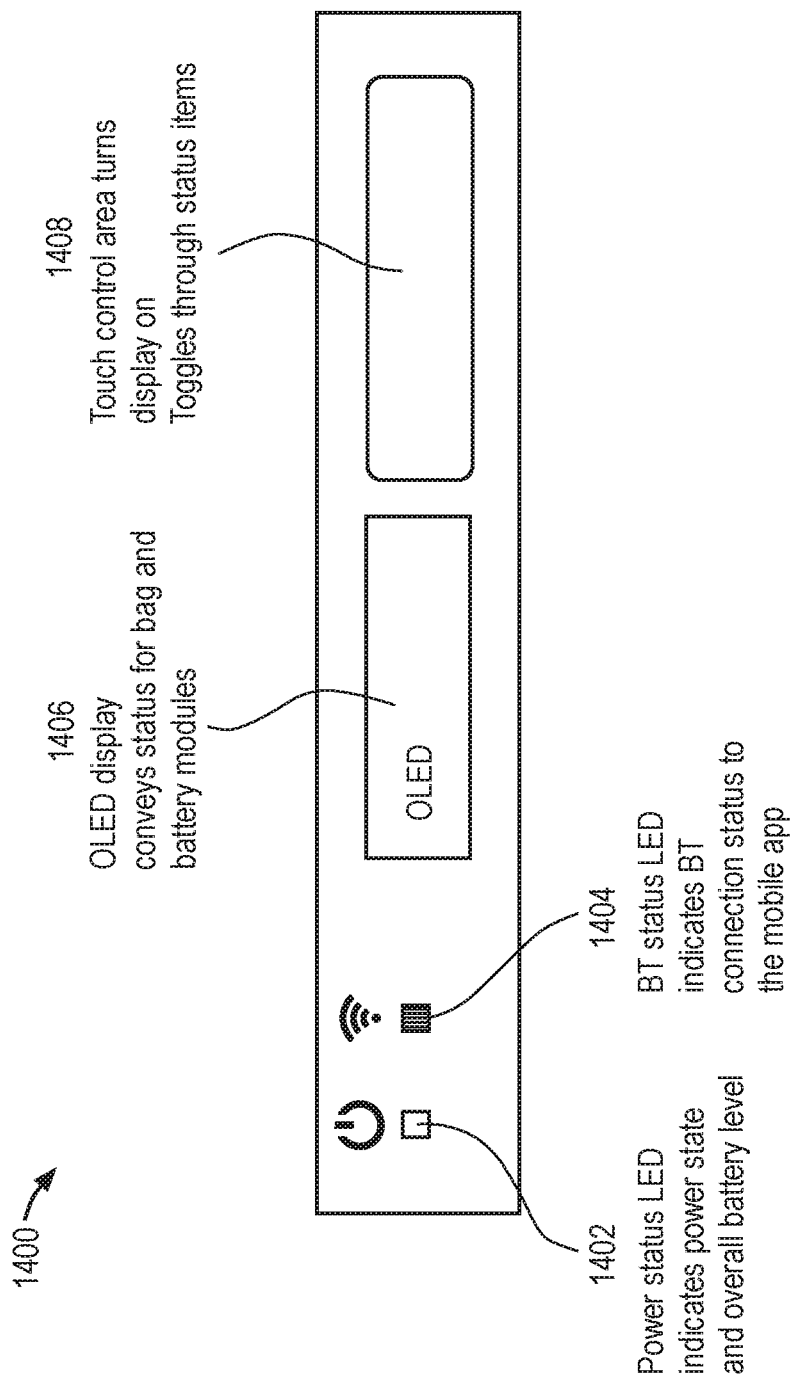
FIG. 14 illustrates indicators, a display and a touch controller in accordance with an embodiment of the invention.

FIG. 14 illustrates an enclosure-mounted user interface in accordance with an embodiment of the invention. The interface 1400 includes indicator LEDs 1402, 1404, an OLED display 1406 and touch-sensitive controller 1408. The color of the power LED 1402 indicates the total combined power of all connected system batteries, with green indicating 50-100% capacity remaining, orange indicating 20-49% capacity remaining and red indicating 1-20% capacity remaining. The Bluetooth indicator 1404 is lit when a smartphone, tablet or computer are connected to the system via Bluetooth LE. The OLED display 1406 is on when plugged into an input power source, or when disconnected from an input power source when the touch controller 1408 is pressed.

Figure 15:
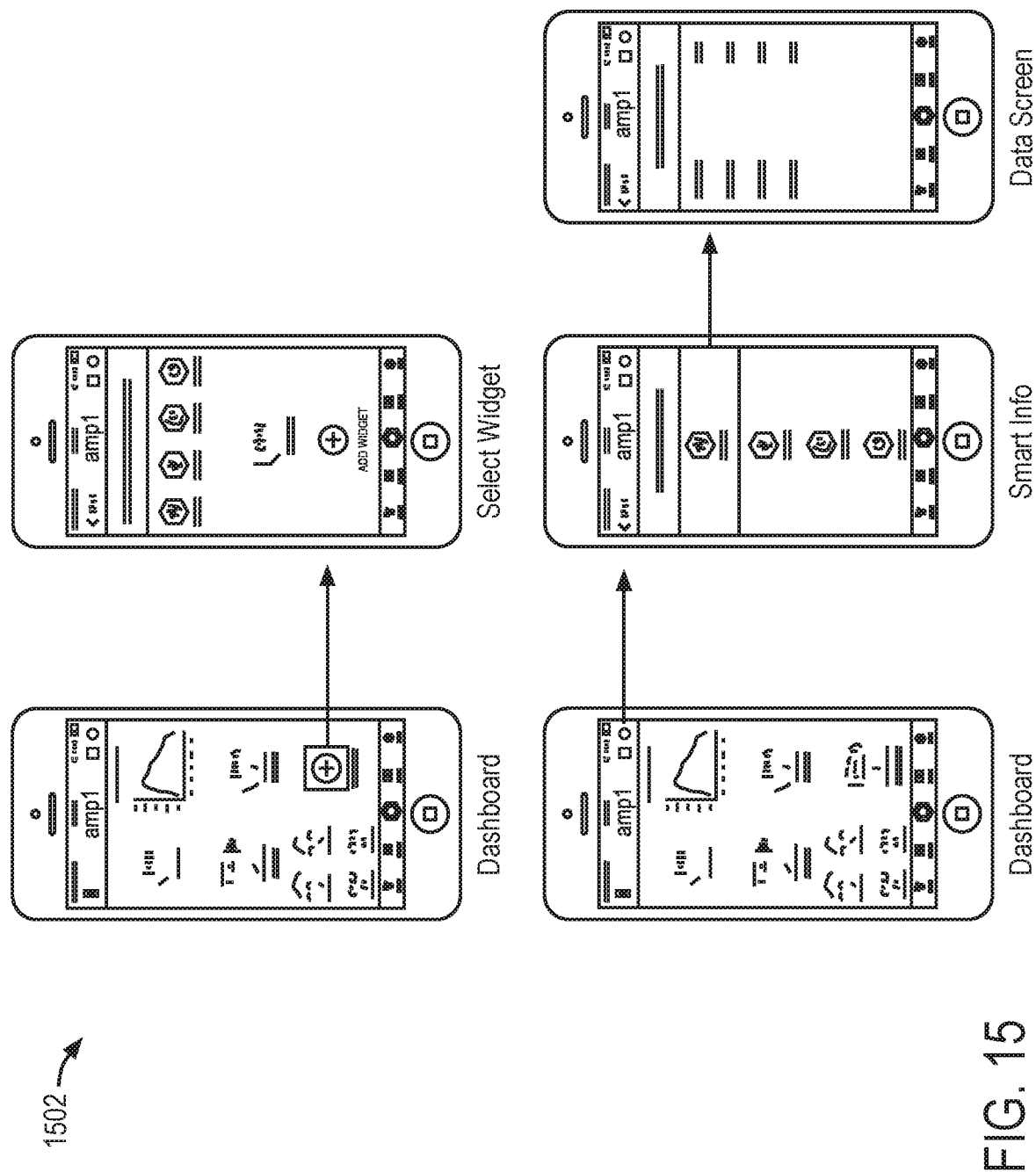
FIG. 15 illustrates a mobile user interface in accordance with an embodiment of the invention.

FIG. 15 illustrates a mobile user interface in accordance with an embodiment of the invention. The home screen of mobile app is the Dashboard screen 1502. The dashboard screen can display six widgets on one page including five pre-defined widgets and one available widget for the user to pick and install. There can be up to six dashboard screens. When a Dashboard screen is fully occupied, another blank page is added. Navigation between Dashboard screens is accomplished by swiping left or right on each Dashboard screen. The Dashboard can be customized by the user. Any widget can be removed by holding down on the widget for a few seconds and selecting the remove icon.

Figure 16:
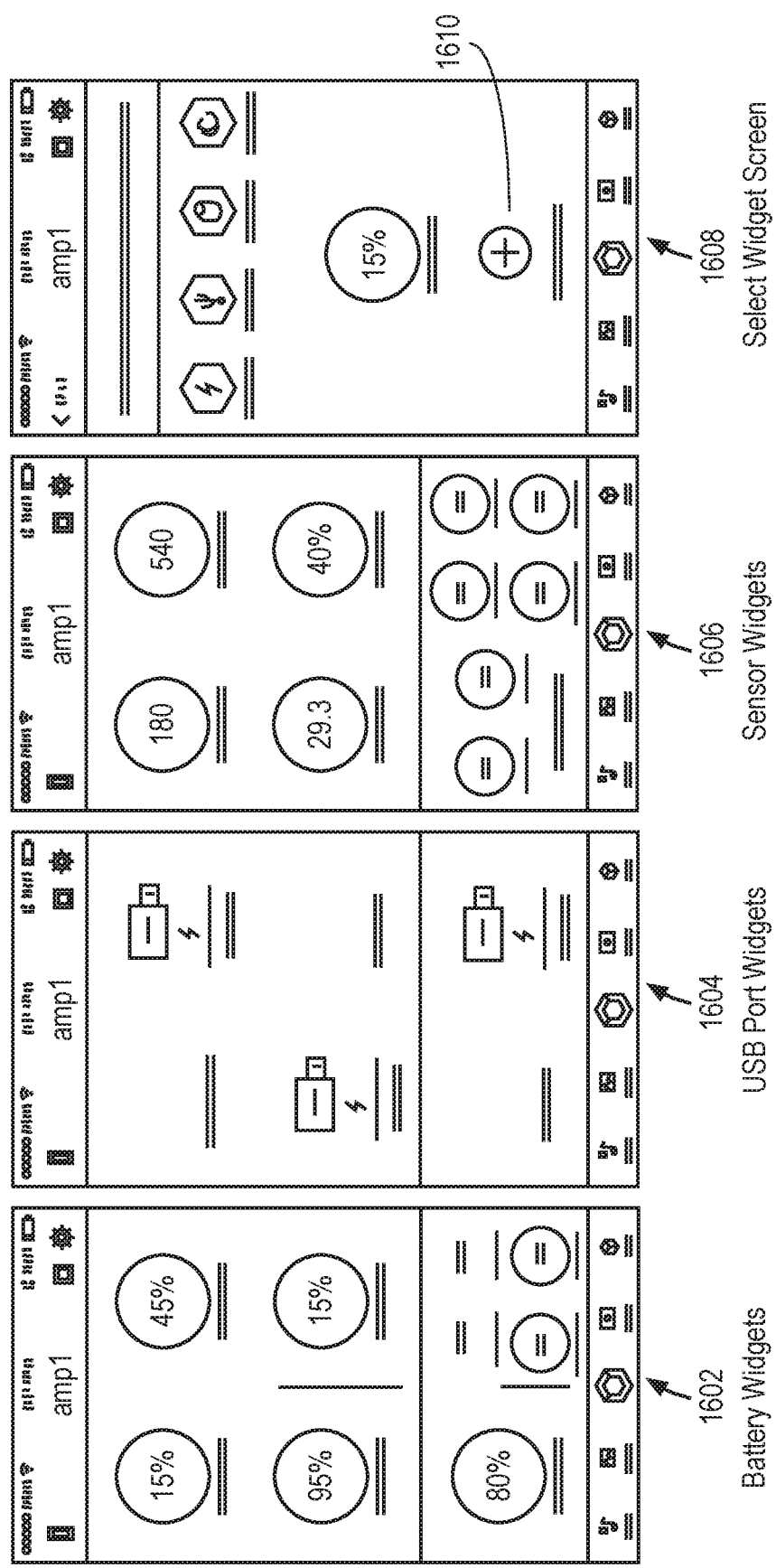
FIG. 16 illustrates mobile application widgets in accordance with an embodiment of the invention.

FIG. 16 illustrates mobile application widgets in accordance with an embodiment of the invention. In one embodiment, there are three categories of widgets: Batteries 1602, USB Charging Ports 1604 and Sensors 1606. Some widgets combine multiple data into a single widget for easy access to all data in a category (all batteries/all sensors).

The select widgets screen 1608 allows the user to select which widget to install. Across the top are the category of widgets to browse and the center of the screen shows the available widgets in each category. The user can swipe left or right to view the widgets and can add the widget to the dashboard by pressing the ADD WIDGET icon 1610.

Figure 17:
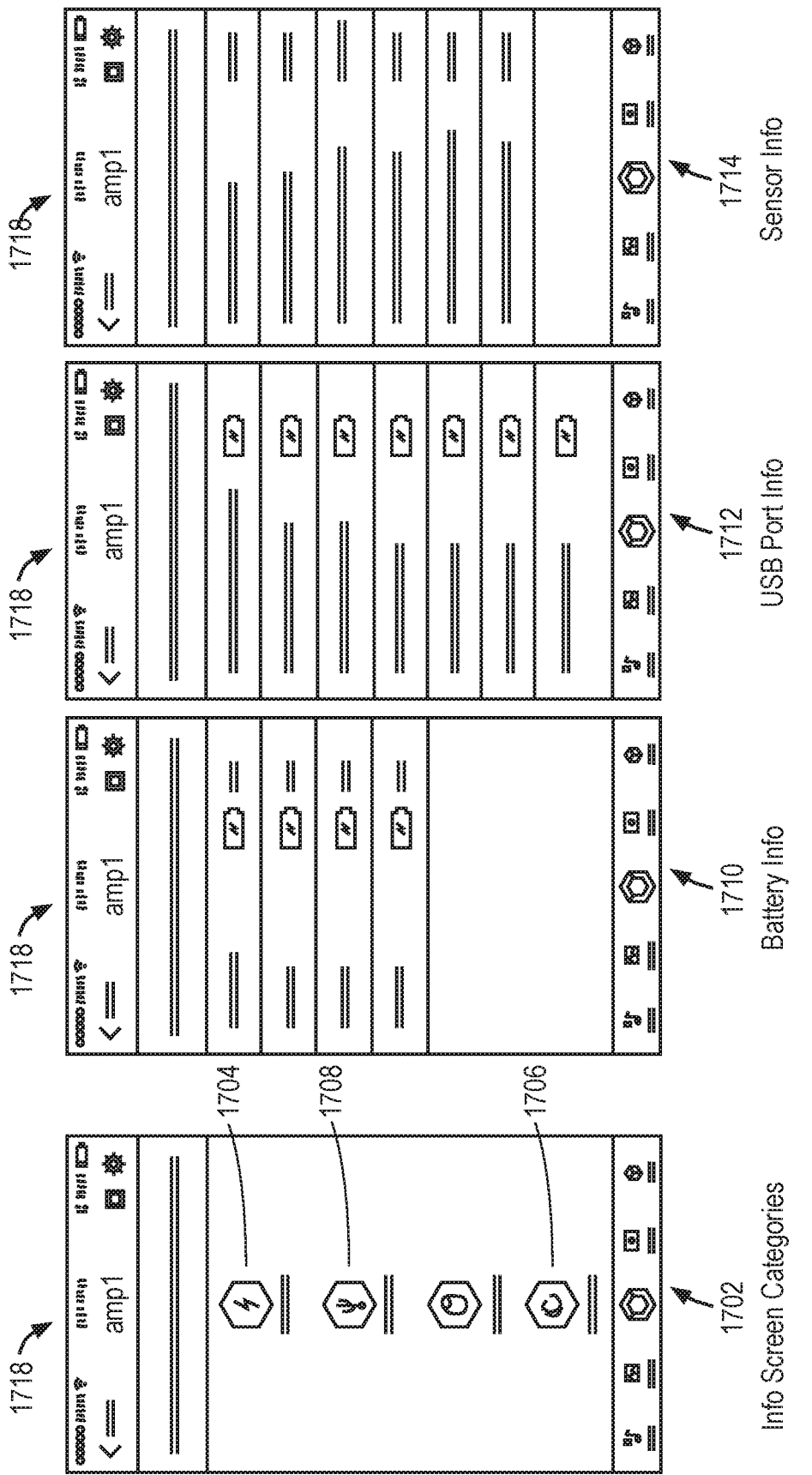
FIG. 17 illustrates additional mobile application widgets in accordance with an embodiment of the invention.

FIG. 17 illustrates additional mobile application widgets in accordance with an embodiment of the invention. The Info Screen Icon 1702 is on the top bar of every screen. Pressing the Info Screen icon allows the user can to view data about the batteries 1704, sensors 1706, and USB ports 1708. The main screen lists the available data sources. The battery info screen 1710 lists the charge status and stored capacity of any connected system batteries. The USB port info screen 1712 shows USB ports with devices connected and which devices are currently receiving charging current. Charging priority can be adjusted by dragging and dropping devices into the desired order. The sensor info screen 1714 reports data obtained from sensors in the bag.

The mobile app user interface can configure features of the apparatus. In one embodiment, the settings 1718 include: (1) Illuminated Logo (On/Off/Motion; Logo Color—RGB Picker), (2) Charging Priority (Dock Charge Priority, USB Port Charge Priority), (3) Battery Modules (Reserve Power Setting—Front Dock (%), Rear Dock (%), Bottom Dock (%)), (4) Mobile App Notifications (All Batteries Charged (on/off), USB Charge Priority List Complete (on/off), All Battery Modules on Reserve (on/off), Internal Battery Low (on/off), Internal Zone Thermal Warning (on/off)), (5) Customize OLED Screens (Total Combined Battery (on/off), Internal Battery (on/off), Front Docking Battery (on/off), Rear Dock Battery (on/off), Bottom Dock Battery (on/off), External Temperature and Humidity (on/off), Internal Zone 1 Temp (on/off), Internal Zone 2 Temp (on/off)).

The mobile app user interface can configure features of the Data from the enclosure to the Mobile App. The settings may include: (1) AC/DC Input (Power Connected/Disconnected (R)), (2) Docking Ports (i) Front Dock (Present/Not Present (R), Module ID (R)), (ii) Rear Dock (Present/Not Present (R), Module ID (R)), (iii) Bottom Dock (Present/Not Present (R), Module ID (R)), (3) Battery Status (i) Integrated Battery (Charging/Discharging (R), Charge Level (0-100%) (R), Capacity Remaining (mAh) (R), Time to Full (minutes) (R), Time to empty (minutes) (R), Charge Cycles (R), Health (R)), (ii) Front Docking Battery (Charging/Discharging/Queued (R), Charge Level (0-100%) (R), Capacity Remaining (mAh) (R), Time to Full (minutes) (R), Time to empty (minutes) (R), Charge Cycles (R), Health (R)), (iii) Rear Docking Battery (Charging/Discharging/Queued (R), Charge Level (0-100%) (R), Capacity Remaining (mAh) (R), Time to Full (minutes) (R), Time to empty (minutes) (R), Charge Cycles (R), Health (R)), (iv) Bottom Docking Battery (Charging/Discharging/Queued (R), Charge Level (0-100%) (R), Capacity Remaining (mAh) (R), Time to Full (minutes) (R), Time to empty (minutes) (R), Charge Cycles (R), Health (R)), (4) USB Charging Ports (i) USB Port 1 (Output On/Off/Queued (R/W), Over Current Protection (R)), (ii) USB Port 2 (Output On/Off/Queued (R/W), Over Current Protection (R)), (iii) USB Port 3 (Output On/Off/Queued (R/W), Over Current Protection (R)), (iv) USB Port 4 (Output On/Off/Queued (R/W), Over Current Protection (R)), (v) USB Port 5 (Output On/Off/Queued (R/W), Over Current Protection (R)), (vi) USB Port 6 (Output On/Off/Queued (R/W), Over Current Protection (R)), (5) Sensor Data (External Temperature (R), External Humidity (R), Internal Zone 1 Temp (R), Internal Zone 2 Temp (R)).

The mobile app user interface can configure features of the Data from the Mobile App to the enclosure. The settings may include: (1) USB Port Charge Priority (Priority 1 (Port 1-6) (R/W), Priority 2 (Port 1-6) (R/W), Priority 3 (Port 1-6) (R/W), Priority 4 (Port 1-6) (R/W), Priority 5 (Port 1-6) (R/W), Priority 6 (Port 1-6) (R/W)), (2) Docking Port Charging Priority (Priority 1 (Dock F/D/R) (R/W), Priority 2 (Dock F/D/R) (R/W), Priority 3 (Dock F/D/R) (R/W)), (3) USB Port Direct Charging Controls (i) USB Port 1 (On/Off (R/W)), (ii) USB Port 2 (On/Off (R/W)), (iii) USB Port 3 (On/Off (R/W)), (iv) USB Port 4 (On/Off (R/W)), (v) USB Port 5 (On/Off (R/W)), (vi) USB Port 6 (On/Off (R/W)), (4) Battery Reserve Level (Integrated Battery (0-75%) (R/W), Front Dock Battery (0-75%) (R/W), Rear Dock Battery (0-75%) (R/W), Bottom Dock Battery (0-75%) (R/W)), (5) Illuminated Logo (On/Off/Motion Activated (R/W), Logo Color (R 0-255/G 0-255/B 0-255) (R/W)), (6) Mobile Phone Push Notification (Text String push to OLED (64 Characters) (W))

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. An apparatus, comprising:
   a plurality of connectors to receive a plurality of batteries;
   a power switch connected to the plurality of connectors to power output ports for charging personal electronic devices;
   a processor connected to the power switch to execute a user configurable battery charge protocol and discharge protocol, wherein the processor executes the user configurable battery charge protocol to establish a sequence of batteries prioritized for charging and wherein the processor executes the user configurable battery charge protocol comprising:
      selecting at least one battery of the plurality of batteries for charging, wherein the at least one battery is in a fast charge state that allows for substantially linear charge performance,
      applying direct current to the at least one battery until the fast charge state is terminated,
      repeating the selecting and applying operations until the fast charge state is terminated in each of the plurality of batteries, and
   directing direct current to the plurality of batteries until a full charge state is reached for each of the plurality of batteries; and
   an interface to receive the user configurable battery charge protocol and discharge protocol.

2. The apparatus of claim 1 wherein the user configurable battery charge protocol and discharge protocol are configurable through a tactile or radio interface positioned on the apparatus.

3. An apparatus, comprising:
   a plurality of connectors to receive a plurality of batteries;
   a power switch connected to the plurality of connectors to power output ports for charging personal electronic devices;
   a processor connected to the power switch to execute a user configurable battery charge protocol and discharge protocol, wherein the processor executes the user configurable battery discharge protocol to establish a sequence of batteries prioritized for discharging and wherein the processor executes the user configurable battery discharge protocol comprising:
      selecting at least one battery of the plurality of batteries according to a user configurable sequence of batteries prioritized for discharging,
      discharging the at least one battery until a user configurable reserve capacity threshold is reached,
      repeating the selecting and discharging operations until the reserve capacity threshold is reached for each of the plurality of batteries; and
   an interface to receive the user configurable battery charge protocol and discharge protocol.

4. The apparatus of claim 3 wherein the processor executes the user configurable battery discharge protocol to establish a sequence of power output ports prioritized for charging.

5. The apparatus of claim 3 further comprising a sensor connected to the processor.

6. An apparatus, comprising:
   a plurality of connectors to receive a plurality of batteries;
   a power switch connected to the plurality of connectors to power output ports for charging personal electronic devices;
   a processor connected to the power switch to execute a user configurable battery charge protocol and discharge protocol; and
   an interface to receive the user configurable battery charge protocol and discharge protocol, wherein the interface reports status of the battery charge and discharge protocols and system information including at least one of:

reporting connected personal electronic devices charging, waiting to charge, or fully charged, reporting the plurality of batteries charging, discharging or idle, reporting the charge level of each battery or the combined total charge level of the plurality of batteries, reporting estimated time to fully charged, time to reserve threshold or time to fully depleted for each of the plurality of batteries, reporting total power output to, or total time of charge for, devices connected to power output ports during historical or instantaneous charging cycles, and reporting historical or instantaneous sensor readings.

7. The apparatus of claim 6 positioned in a portable container.

8. An apparatus, comprising:

a plurality of connectors to receive a plurality of batteries;

a power switch connected to the plurality of connectors to power output ports for charging personal electronic devices;

a processor connected to the power switch to execute a user configurable battery charge protocol and discharge protocol; and an interface to receive the user configurable battery charge protocol and discharge protocol, wherein the interface provides alerts or notifications to the user of system events including at least one of:

battery charging stopped for one or more batteries, battery discharging stopped for one or more batteries, device charging stopped for one or more power output ports, critical system condition or error occurred, and sensor recorded data within a threshold range.

9. An apparatus, comprising:

a connector to receive a removable battery;

a power switch connected to the connector to power output ports for charging personal electronic devices;

a processor connected to the power switch to execute a user configurable battery discharge protocol; and an interface to receive the user configurable battery discharge protocol, wherein the interface reports status of the battery discharge protocol and system information including at least one of:

reporting connected personal electronic devices charging, waiting to charge, or fully charged, reporting the battery charging, discharging or idle, reporting the charge level of the battery, reporting estimated battery time to fully charged, time to reserve threshold or time to fully depleted, reporting total power output to, or total time of charge for, devices connected to power output ports during historical or instantaneous charging cycles, and reporting historical or instantaneous sensor readings.

10. The apparatus of claim 9 wherein the processor executes the user configurable battery discharge protocol to establish a sequence of power output ports prioritized for charging.

11. The apparatus of claim 9 wherein the user configurable battery discharge protocol is configurable through a tactile or radio interface positioned on the apparatus.

12. The apparatus of claim 9 wherein the processor executes the user configurable battery discharge protocol to discharge the removable battery until a user configurable reserve capacity threshold is reached.

13. The apparatus of claim 9 further comprising a sensor connected to the processor.

14. An apparatus, comprising:

a connector to receive a removable battery;

a power switch connected to the connector to power output ports for charging personal electronic devices;

a processor connected to the power switch to execute a user configurable battery discharge protocol; and an interface to receive the user configurable battery discharge protocol, wherein the interface provides alerts or notifications to the user of system events, including at least one of:

battery charging stopped, battery discharging stopped, device charging stopped for one or more power output ports, critical system condition or error occurred, and sensor recorded data within a threshold range.

15. The apparatus of claim 14 positioned in a portable container.

* * * * *